United States Patent [19]

Remi et al.

[11] 4,238,257
[45] Dec. 9, 1980

[54] INSULATING SLAB OF REFRACTORY FIBRES

[75] Inventors: Jean-Pierre Remi; Guy Géhin, both of Bron, France

[73] Assignee: Societe Europenne des Produits Refractaires, Neuilly-Sur-Seine, France

[21] Appl. No.: 943,462

[22] Filed: Sep. 18, 1978

[30] Foreign Application Priority Data

Sep. 19, 1977 [FR] France ............................. 77 28160

[51] Int. Cl.³ .................. B32B 5/12; B32B 3/12; E04B 2/00; C04B 33/34
[52] U.S. Cl. ..................................... 156/71; 156/81; 156/89; 156/155; 156/295; 156/306.6; 428/114; 428/119; 428/195; 428/223; 428/302; 428/920
[58] Field of Search ............... 156/71, 81, 89, 155, 156/304, 295; 428/114, 119, 120, 210, 223, 195, 302, 920

[56] References Cited

U.S. PATENT DOCUMENTS

| | | | |
|---|---|---|---|
| 2,859,489 | 11/1958 | Morrison | 428/119 |
| 3,342,665 | 9/1967 | Shannon | 428/114 |
| 3,345,241 | 10/1967 | Shannon | 428/114 |
| 3,579,410 | 5/1971 | Barrett | 156/71 |
| 3,819,468 | 6/1974 | Sauder et al. | 428/114 |
| 3,832,815 | 9/1974 | Balaz et al. | 428/920 |
| 3,930,916 | 1/1976 | Shelley | 428/920 |
| 3,953,641 | 4/1976 | Marquis | 428/195 |
| 4,025,680 | 5/1977 | Botsolas et al. | 428/302 |
| 4,120,641 | 10/1978 | Myles | 428/119 |

FOREIGN PATENT DOCUMENTS 2319865 2/1977 France .
845744 8/1960 United Kingdom ................ 428/109

Primary Examiner—William R. Dixon, Jr.
Attorney, Agent, or Firm—Watson, Cole, Grindle & Watson

[57] ABSTRACT

The invention relates to a heat-insulating slab formed by a plurality of continuous strips maintained in assembly side by side, each strip comprising entangled refractory fibres the major portion of which is perpendicular to the two main faces of the slab, the strips being maintained in assembly exclusively by means of a plurality of lines, ribbons or cords of an organic synthetic matter which adhere to the strips and are applied to the two main faces of the slab perpendicular to the strips. This slab is useful for insulating the inner surfaces of furnaces.

7 Claims, 1 Drawing Figure

U.S. Patent        Dec. 9, 1980        4,238,257
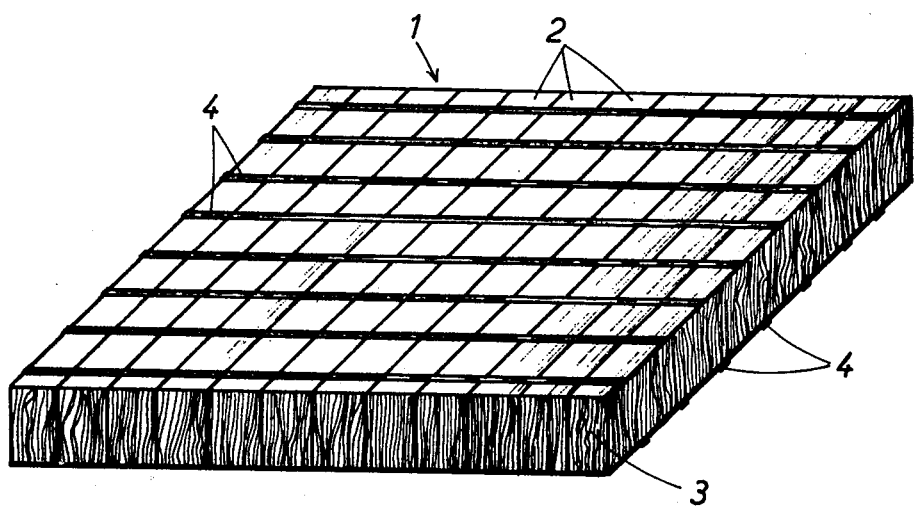

INSULATING SLAB OF REFRACTORY FIBRES

This application relates to U.S. Ser. No. 940,106, filed Sept. 6, 1978, and commonly owned herewith.

The thermal insulation of furnaces may be carried out in various ways.

The most usual approach involves constructing the hottest zone of the furnace of suitable dense refractory materials and then insulating such wall from the outside by various layers of rigid or fibrous insulating refractory materials. In certain cases the hottest zone may itself comprise a rigid insulating refractory material.

For old furnaces the problem is often more complex because supplementary external insulation always brings about a reduction of the temperature gradient in the old brickwork and hence an overheating of it which is often incompatible with the qualities of refractory bricks already in position.

One solution involves insulating the hot internal face of such furnaces with a rigid insulating refractory material and numerous approaches of this type have been made.

Nevertheless they pose some problems since for example, it is difficult to apply the rigid insulating refractory material to a thickness less than 100 mm if stable brickwork is to be obtained. This would sometimes considerably reduce the volume of the furnace, which renders this technique unusable.

Another solution involves fastening flexible sheets of refractory fibres, several meters long, directly to the internal walls of the furnace. Direct gluing of such sheets being rather difficult, the sheets of fibres are fixed into the brickwork in a mechanical way. Depending on the temperature of the furnace these attachments may be metallic or ceramic. Numerous applications of this type have already been effected, although they are disadvantageous because of the considerable work of preparation required in the furnace itself, and because the risk of loosening the structures already in place.

The present invention relates generally to a slab comprising a sheet of refractory fibres, which is easy to manufacture and attach, and which exhibits a noteworthy behaviour in use, as well as a method of attachment of this slab.

More particularly the invention relates to a heat-insulating refractory slab formed by a plurality of continuous strips maintained in assembly side by side, each strip comprising entangled refractory fibres the major portion of which is perpendicular to the two main faces of the slab, characterized in that the strips are maintained in assembly exclusively by means of a plurality of lines, ribbons or cords of an organic synthetic matter which adhere to the strips and are applied to the two main faces of the slab perpendicular to the strips.

The term "exclusively" signifies that the lines, ribbons or cords constitute the sole means of assembly to the exclusion of any other means of assembly.

The lines, ribbons or cords may comprise very diverse materials. Advantageously these lines, ribbons or cords are formed by application of a thermoplastic adhesive material in the molten state (adhesives known as "hot-melt") in the form of lines parallel to one another and perpendicular to the strips which after cooling will form adherent lines of thermoplastic resin maintaining the strips assembled. Instead of a "hot-melt" adhesive any adhesive composition may be emloyed which undergoes catalytic chemical hardening, or thermal hardening-like adhesives may be used having a base of natural latex or synthetic latex having a base of vinyl acetate, or resins of phenol-formol type may be used. The adherent material applied should advantageously exhibit a certain flexibility or deformability, that is to say, not be too rigid or brittle, in order to be able to attach the slab without difficulty to the surface to be insulated by means of a refractory cement.

By way of indication, the lines, ribbons or cords may have a width of 1 to 5 mm and be applied at intervals of 10 to 100 mm.

The slab of the invention is manufactured by cutting, from a sheet of entangled refractory fibres, continuous strips which exhibit by way of indication in cross-section dimensions of 10 to 100 mm by 5 to 50 mm and of any desired length, thereafter assembling these strips side by side so that the majority of the fibres is perpendicular to the two main faces of the slab thus formed and finally applying the lines, ribbons or cords of adherent matter to the two main faces of the slab.

Any type of refractory fibres may be employed which are usually employed for manufacturing heat-insulating refractory sheets or felts. For example, such fibres may be obtained from a mixture of aluminium and silica, or may be of pure kaolinite, which is melted in an electric furnace, the liquid mixture being then passed in front of a jet of air or steam with the formation of small droplets which thin down into fine fibres. Such fibres are sold in the trade under the brand names Kerlane, Fiberfrax, Kaowool and Cerafelt, for example.

In order to attach the slab of the invention to the surface to be insulated, for example, to the hot face of a furnace, the attachment face (one of the main faces of the slab) is coated with a refractory cement and the coated face is applied against the surface to be insulated, the latter being preferably likewise previously coated with cement.

Refractory cements which may be employed include the well known cements having a base of silica, alumina and/or clay the bonding of which is ensured in a purely ceramic way or by means of a mineral binder such as a sodium or potassium silicate (if necessary with the addition of sodium fluorosilicate as accel-erator), an aluminium phosphate, an aluminium oxychloride, etc., which does not lower the melting point of the cement below the limit of use of the heat-insulating slab.

In service at high temperature the material comprising the lines, ribbons or cords is volatilized, leaving the strips of refractory fibres held in assembly solely by the refractory cement.

The following description, in relation to the accompanying drawing, is given by way of non-restrictive example and will let it be understood clearly how the invention may be realized.

The sole FIGURE is a perspective view of a slab in accordance with the invention.

A square slab 1 is shown as comprising 12 strips 2, formed of entangled refractory fibres 3 the major portion of which is orientated perpendicularly to the main faces of the slab. These strips are maintained in assembly side by side as shown, by a plurality of lines 4 of an adhesive applied in the molten state ("hot-melt" adhesive), applied to the two main faces of the slab perpendicularly to the longitudinal direction of the strips.

The following non-restrictive examples further illustrate the invention.

EXAMPLE 1

A square slab of 300×300×38 mm such as that shown in the FIGURE was produced from 12 strips of 300×38×25 mm cut from a sheet of refractory fibres sold in the trade under the brand Kerlane 60, weighing 160 kg/m³. The Kerlane 60 fibres are formed of refractory fibres containing 39.5% of silica and 60% of alumina. The strips are assembled side by side so that the majority of the fibres are directed perpendicularly to the main faces of the slab. The assembly of these strips is produced by application by means of a Nordson type applicator, to each of the main faces of the slab, of 8 substantially equidistant lines of a "hot-melt" adhesive sold in the trade under the brand name Dispoflex 209 by the Société Béricol National. 2 g of adhesive is applied per linear meter.

The slab thus obtained was attached to the interior wall of a furnace by means of a cement sold in the trade under the brand name Fixaool Mod, the composition of which is the following:

51–53% of $Al_2O_3$, 20–22% of $SiO_2$ and 4–5% $Na_2O$ (coming from the sodium silicate binder) and the remainder, water.

This cement exhibits a density after firing at 1200° C. of 1.7 and a linear contraction of 0.5–1% after 4 hours at 1200° C. 4 to 5 kg of cement is applied per m², half for the pre-gluing of the furnace and half for the coating of the slab. After a test of four hours in service at 1400° C. a linear contraction of only 3% is observed in the direction of the strips and of 4% in the direction of the thickness of the slab, which is satisfactory and demonstrates the good behaviour in service of the slab of the invention.

EXAMPLE 2

The general operative method of Example 1 is followed, except that:

(a) a vinylic glue is employed, sold in the trade under the brand name Glutafix NA instead of the "hot-melt" adhesive, this glue being applied at the rate of 3 g per linear meter;

(b) to each face of the slab are applied only 6 equidistant lines 4 instead of 8;

(c) the slat has dimensions 300×300×50 mm and is comprised of strips formed from a sheet of Kerlane 45 fibres weighing 128 kg/m³.

The same cement Fixwool Mod is employed in the same amounts for the laying of the slab.

After a test of four hours in service at 1200° C. a linear contraction of 0.5 to 1% is observed; after four hours at 1300° C. a linear contraction of 2 to 3% is observed.

These results are satisfactory and demonstrate the good behaviour in service of the slab in accordance with the invention.

Obviously, the embodiment represented is only one example, it being possible to modify it especially by substitution of equivalent techniques without thereby departing from the scope of the invention.

We claim:

1. A heat-insulating refractory slab comprising a plurality of continuous strips disposed in contacting side-by-side relationship, each said strip comprising entangled refractory fibres, a major portion of said fibres being perpendicular to opposing surfaces of the slab, a plurality of ribbons of an organic synthetic adhesive material being provided for exclusively maintaining said strips in said side-by-side relationship, said ribbons being adhered to said strips and being applied to said opposing surfaces perpendicularly to said strips.

2. A slab as in claim 1, wherein ribbons are formed of an adhesive material disposed in a molten state to said opposing surfaces.

3. A slab as in claim 1, wherein said organic synthetic adhesive material comprises a hot-melt adhesive.

4. A slab as in claim 1, wherein said organic synthetic adhesive material comprises a hardenable adhesive composition.

5. A method of securing a slab to a solid surface to be heat-insulated, said slab comprising a plurality of continuous strips disposed in contacting side-by-side relationship, each said strip comprising entangled refractory fibres, a major portion of said fibres being perpendicular to opposing surfaces of the slab, a plurality of ribbons of an organic synthetic adhesive material being provided for exclusively maintaining said strips in said side-by-side relationship, said ribbons being adhered to said strips and being applied to said opposing surfaces perpendicularly to said strips, the method including the steps of coating one of said opposing surfaces of said slab with a refractory cement, coating said solid surface with said refractory cement, and applying said one surface against said solid surface to be insulated.

6. A method as in claim 5, wherein said refractory cement has a base of silica, alumina and/or clay.

7. A method as in claim 5, wherein said solid surface to be insulated comprises an interior surface of a furnace.

* * * * *